(12) United States Patent
Huege et al.

(10) Patent No.: US 6,395,205 B1
(45) Date of Patent: *May 28, 2002

(54) METHOD OF MANUFACTURING AN AERATED AUTOCLAVED CONCRETE MATERIAL

(75) Inventors: Fred R. Huege, Colleyville; Kevin D. Ingram, Fort Worth, both of TX (US); Gregory B. Pendleton, Montevallo, AL (US); Diethelm Walter, Waterloo (BE)

(73) Assignee: Chemical Lime Company, Fort Worth, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,474

(22) Filed: Jul. 7, 1997

Related U.S. Application Data (60) Provisional application No. 60/022,108, filed on Jul. 17, 1996.

(51) Int. Cl.$^7$ .............................. B28B 1/14; B28B 1/50; B28B 11/24; C04B 40/06
(52) U.S. Cl. ........................... 264/42; 264/82; 264/333; 106/724; 106/727; 106/729; 106/735; 106/737; 106/792
(58) Field of Search ........................... 264/82, 333, 42; 106/724, 727, 729, 735, 737, 792

(56) References Cited

U.S. PATENT DOCUMENTS

| | | | |
|---|---|---|---|
| 1,932,971 A | * 10/1933 | Huttermann et al. | |
| 2,956,867 A | 10/1960 | Volk et al. | 23/293 |
| 2,957,776 A | 10/1960 | Volk | 106/118 |
| 3,498,334 A | 3/1970 | Pittman, Jr. et al. | 138/145 |
| 3,511,600 A | 5/1970 | Kim | 23/109 |
| 3,649,317 A | * 3/1972 | Houseknecht | 106/657 |
| 3,808,299 A | * 4/1974 | Svensson | 264/256 |
| 3,864,141 A | * 2/1975 | Uchikawa et al. | 106/776 |
| 3,979,217 A | * 9/1976 | Sutton | 264/333 |
| 4,102,962 A | 7/1978 | Matsui et al. | 264/82 |
| 4,205,994 A | * 6/1980 | Moyer, Jr. et al. | 106/738 |
| 4,211,571 A | 7/1980 | Hartmann et al. | 106/87 |
| 4,214,911 A | 7/1980 | Siejko et al. | 106/87 |
| 4,229,393 A | * 10/1980 | Wesche et al. | 264/333 |
| 4,329,178 A | 5/1982 | Kalvenes et al. | 106/87 |
| 4,401,471 A | 8/1983 | Eckardt et al. | 106/87 |
| 4,422,989 A | 12/1983 | Hums et al. | 264/42 |
| 4,443,562 A | 4/1984 | Mayer | 521/83 |
| 4,464,353 A | * 8/1984 | Hains | |
| 4,470,921 A | 9/1984 | Lin | 252/189 |
| 4,568,390 A | * 2/1986 | Gelbman | 264/336 |
| 4,613,472 A | 9/1986 | Svanholm | 264/42 |
| 4,650,523 A | 3/1987 | Kikuchi et al. | 106/315 |
| 4,655,979 A | 4/1987 | Nakano et al. | 264/42 |
| 4,660,985 A | 4/1987 | Mills et al. | 366/5 |
| 4,673,437 A | * 6/1987 | Gelbman | 264/333 |
| 4,683,003 A | 7/1987 | Nakano et al. | 106/86 |
| 4,799,961 A | * 1/1989 | Friberg | 106/720 |
| 4,824,479 A | 4/1989 | Matsuoka et al. | 75/0.5 R |
| 4,988,342 A | * 1/1991 | Berg et al. | 264/256 |
| 5,275,650 A | 1/1994 | Mongoin et al. | 106/465 |
| 5,277,837 A | 1/1994 | Dumont et al. | 252/190 |
| 5,286,427 A | 2/1994 | Koumal | 264/40.1 |
| 5,332,436 A | 7/1994 | Walker, Jr. et al. | 106/792 |
| 5,494,513 A | 2/1996 | Fu et al. | 106/672 |
| 5,788,761 A | * 8/1998 | Hums et al. | 106/695 |

FOREIGN PATENT DOCUMENTS

JP        10-53472 A    *  2/1998   ........... C04B/38/02

OTHER PUBLICATIONS

International Preliminary Examination Report, Apr. 23, 1998 for PCT/US97/11729.
PCT International Search Report—International Application No. PCT/US97/11729.
"Autoclaved Cellular Concrete", Architecture, Oct. 1992, pp. 106–108.
Chemistry and Technology of Lime and Limestone, pp. 214–217, 336.

* cited by examiner

*Primary Examiner*—Jan H Silbaugh
*Assistant Examiner*—Michael I. Poe
(74) *Attorney, Agent, or Firm*—Bracewell & Patterson, LLP (57) ABSTRACT

A method for manufacturing an aerated autoclaved concrete material. A quick-stiffening mixture is prepared by combining a silica containing material, quicklime, a rising agent, gypsum, cement and water. The mixture is deposited into a mold and is allowed to form a stiffened body. The stiffened body is removed from the mold and placed in an autoclave station in which it is steam cured at elevated temperature and pressure. The quicklime which is used to form the quick-stiffening mixture is modified with a chemical modifier to provide a desired degree of chemical reactivity in the quick-stiffening mixture.

7 Claims, 9 Drawing Sheets

METHOD OF MANUFACTURING AN AERATED AUTOCLAVED CONCRETE MATERIAL

CROSS-REFERENCE TO RELATED APPLICATION

Benefit is herein claimed of the filing date under 35 U.S.C. §§119 and/or 120, and 37 C.F.R. §1.78 to U.S. provisional patent application Serial No. 60/022,108, filed on Jul. 17, 1996, entitled "Controlled Reactivity Quicklime And Method For Producing Aerated Autoclaved Concrete."

BACKGROUND OF THE INVENTION

1. Field of the Invention

This invention relates generally to a process for producing foamed or cellular concrete molded articles by subjecting a molded article obtained from a slurry of quick-stiffening cement compound to high temperature and high pressure curing in which a controlled reactivity quicklime component is utilized in forming the slurry.

2. Description of the Prior Art

The production of low density aerated autoclaved concrete is well established. Aerated autoclaved concrete is manufactured by mixing a silica rich material such as fine ground sand or fly ash, cement, a sulfate source such as gypsum, quicklime, a rising agent such as aluminum powder, and water. In a first chemical reaction, the quicklime reacts with the water to form heat and calcium hydroxide. The calcium hydroxide, in turn, reacts with the water and aluminum powder to form hydrogen gas which expands the concrete mix to about twice its original volume, or more. Similar to bread rising, the mix expands into a porous mass.

After expansion has occurred, the porous mass is cut to a desired size and shape and is placed in an autoclave to build strength, rigidity and durability with the cement component serving to harden the mass. The autoclave is an airtight chamber that is filled with pressurized steam. During the autoclaving process, which is the formation of C—S—H gel tobermorite, typically 10–12 hours, a second chemical reaction occurs that gives the highly porous material its strength, rigidity and durability.

The rate of reaction, or reactivity, of the quicklime with water and the subsequent reaction of calcium hydroxide and water with aluminum powder in the first chemical reaction is critical to the development of the required characteristics of the final product. In particular, a controlled reactivity quicklime is necessary for the development of uniform cell structure within the porous mass.

At the present time, the reactivity of quicklime used in producing aerated autoclaved concrete is controlled or varied by varying the calcination parameters of the manufacturing operation which produces quicklime itself. By altering the temperature of calcination, the duration of calcination, and the type of calciner used, quicklime can be manufactured with a reactivity in a range from highly reactive for light-burned quicklime, to slightly reactive for hard-burned quicklime. This method to control the reactivity of quicklime for use in aerated autoclaved concrete requires a significant amount of time to set up and is effective only when producing large quantity of quicklime with a particular reactivity. In addition, variations in the quality of the quicklime can have adverse effects on the quality of the aerated autoclaved concrete.

A need exists, therefore, for an improved controlled reactivity quicklime which is useful in producing aerated autoclaved concrete.

A need exists for such a controlled reactivity quicklime which does not depend upon the calcination process itself or varying the parameters of such process.

A need exists for a controlled reactivity quicklime which can be fine tuned to produce a variety of quicklime reactivities quickly and economically, even in small quantities.

A need exists for a chemical modifier to produce a controlled reactivity quicklime having a particular reactivity for a particular end use.

A need exists for a chemical modifier to produce a controlled reactivity quicklime which can be used to either pretreat the quicklime prior to use in other processes or which can be added directly to a slurry of the quicklime and water and other ingredients.

A need exists for a chemically modified quicklime with a controlled reactivity which does not have adverse effects on the quality of the ultimate aerated autoclaved concrete which is produced.

SUMMARY OF THE INVENTION

The present invention discloses an improved method for the production of aerated autoclaved concrete in which the properties of the aerated autoclaved concrete are controlled or varied by controlling or varying the reactivity of the quicklime component of the aerated autoclaved concrete mix. The present invention also discloses a method of producing an improved quicklime, for use in aerated autoclaved concrete, with a desired reactivity. The reactivity of the quicklime can be altered by the addition of certain chemical modifiers either prior to or simultaneously with the mixing of the aerated autoclaved concrete components. Alteration of the reactivity of the quicklime produces corresponding changes in the properties of the aerated autoclaved concrete. A decrease in the reactivity of the quicklime generally produces desirable changes in the properties of the aerated autoclaved concrete, such as a more uniform cell structure, lower density, higher strength and higher durability. The method of the present invention allows for the production of aerated autoclaved concrete of selected properties, without modification to conventional calcination processes and independent of the variability and quality of the quicklime.

In the method of manufacturing an aerated autoclaved concrete material, a quick-stiffening mixture is prepared by combining a silica rich material, quicklime, a sulfate source such as gypsum, a rising agent, cement and water. The mixture is deposited into a mold and is allowed to form a stiffened body. The stiffened body is removed from the mold and is placed in an autoclave station in which it is steam cured at elevated temperature and pressure. The quicklime which is used to form the quick-stiffening mixture is modified with a chemical modifier to provide a desired degree of chemical reactivity in the quick-stiffening mixture.

Preferably, the chemical modifier is selected from the group consisting of glycerol, glycols, lignosulfonates, amines and polyacrylates, metal sulfates, gypsum, sulfuric acid, phosphoric acid, carboxylates, sucrose and mixtures thereof. Most preferably, the chemical modifier is selected from the group consisting of sulfuric acid, gypsum, alkali and alkaline earth metal lignosulfonates, glycerol, ethylene glycol, diethylene glycol, triethylene glycol, monoethylene amine, diethylene amine, triethanolamine, polyacrylates, water and mixtures thereof. Examples of suitable polyacrylates include the alkali metal salts of polyacrylic acid, for example sodium polyacrylate (SPAL) and potassium polyacrylate.

Additional objects, features and advantages will be apparent in the written description which follows.

DETAILED DESCRIPTION OF THE INVENTION

Aerated autoclaved concrete, as well as similar types of porous steam cured lightweight concrete, e.g., foam concrete, is produced in a well known and traditional manner. Any of several available silica containing materials, such as sand, fly ash or similar materials, is mixed with quicklime, a sulfate source such as gypsum, cement, a rising agent and water. In the case of aerated concrete, the most common rising agent is aluminum powder. When these materials are homogenized and brought into close contact, the quicklime (CaO) reacts with water and the silica ($SiO_2$) material and forms a type of calcium silicate hydrate mass at the same time that the aluminum powder reacts with the water and calcium hydroxide which is formed to develop hydrogen gas. The evolution of the hydrogen gas gives the mass a macroporosity. This pore formation results in an increase in the volume of the mass from a limited initial volume to a relatively large volume, e.g. twice the initial volume.

In practice, the slurry of components are mixed together to form a quick-stiffening mixture which is placed into a mold from a suitable mixing device. After rising, the mass is allowed to stiffen in the mold during a suitable stiffening time. During this stiffening time, a semi-plastic body is formed which has a relatively low strength but which is sufficiently stiff to form a green body without support from the mold which can be transported on its own. As soon as this stiffness occurs, the body is typically removed from the mold and is cut or divided into a suitable shape or number of pieces, the resulting shapes being suitable for use in the building industry. The divided sections of the stiffened body are placed in an autoclaving station where they are steam cured at high pressure and temperature, e.g., 170–200° C., in order to obtain a prerequisite strength. The body can then be transported from the autoclaving station to an unloading station in which the elements of the body are separated from each other and are packaged and/or transported to a desired location.

During the reaction between the water, quicklime silica and aluminum, heat is evolved. It is desirable to control this heat evolution since too fast a temperature increase in the mass produces difficulties in controlling the rising process and produces other undesirable effects such as lack of uniform pore size in the ultimate mass. Hard burnt lime, which reacts slowly with limited development of heat has been widely used for the manufacture of aerated autoclaved concrete because of its slower reactivity. The use of a hard-burned quicklime has a number of disadvantages including the fact that hard-burnt lime is considerably more expensive than soft burnt, highly reactive lime of the type used, e.g., in the steel industry. Another inconvenience is that the hard burnt lime gives a relatively long stiffening time which slows the manufacturing process. Also, as has been mentioned, controlling the reactivity of the quicklime by controlling the calcination parameters during the calcining process requires a significant amount of time to set up and is effective only when producing large quantities of quicklime for a particular reactivity.

Aerated autoclaved concrete (AAC) weighs less than about two-thirds of conventional concrete and has thermal insulation values of up to R-1.6 per inch, more than twice that of typical concrete. It can be created in varying densities, depending upon the mixture of components and can be tailored to specific designs. Very low density ACC, for example, has a low compressive strength but a high insulation value. A typical 8×8×16 inch block, with a density of about 30 pounds per cubic foot offers a compressive strength of more than 500 pounds per square inch and a R-value of approximately 10.

The low weight and high insulation value of AAC, coupled with its relatively high strength allows it to function as an excellent structural insulating system. Unlike traditional concrete, which usually requires external insulation, AAC can be used in moderate climates without external insulation in low rise commercial, industrial and residential buildings. The material's lower weight also makes it easier to transport, lift and assemble than typical pre-cast concrete elements. The material's fire resistance and high degree of sound absorption also make it useful for interior building materials.

With these factors in mind, the present invention provides an improved controlled reactivity quicklime for use in an aerated autoclaved concrete production method. In one embodiment of the present invention, quicklime is calcined in a rotary kiln by conventional methods. The quicklime is used in preparing a quick-stiffening mixture by combining a silica containing material, quicklime, a sulfate source, a rising agent, cement and water. The slurry or mixture is deposited into a mold and is allowed to form a stiffened body. The stiffened body is removed from the mold and is placed in an autoclaved station in which it is steam cured at elevated temperature and pressure. The quicklime which is used to form the quick-stiffening mixture is modified with a chemical modifier to provide a desired degree of chemical reactivity in the quick-stiffening mixture.

Preferably, the silica rich material is selected from the group consisting of sand, fly ash, mine tailings and combinations thereof. The cement can conveniently be selected from the group consisting of ordinary Portland cement, high alumina cement, gypsum cement and blends of two or more thereof. The preferred rising agent is aluminum powder. The chemical modifier is preferably selected from the group consisting of glycerol, glycols, lignosulfonates, amines, polyacrylate type materials, alkali and alkaline earth metal sulfates, gypsum, sulfuric acid, phosphoric acid, carboxylates, sucrose, water and mixtures thereof. Examples of the metal sulfates include calcium sulfate and sodium sulfate. Examples of suitable polyacrylate type materials include the alkali metal salts of polyacrylic acid, for example sodium polyacrylate (SPAL) and potassium polyacrylate. However, due to the relative low cost and availability of sodium polyacrylate, it is preferred. Other materials such as co-polymers of polyacrylate are also effective. A commercially available polyacrylate is "DISPEX N40V", available from Allied Colloids. Other anionic polyelectrolytes such as polycarboxylic acid, polyphosphoric acid, copolymers of polycarboxylic acid and polyphosphoric acid and the alkali metal salts thereof may also be useful.

Most preferably, the chemical modifier is selected from the group consisting of sulfuric acid, gypsum, water, alkali and alkaline earth metal lignosulfonates, glycerol, ethylene glycol, diethylene glycol, triethylene glycol, monoethylene amine, diethylene amine, triethanolamine, polyacrylates and mixtures thereof. The chemical modifier is used in the range from about 0.1 to 5% by weight, preferably about 0.1 to 2% by weight, most preferably about 0.5 to 1% by weight of quicklime, based upon the particular modifier chosen.

Thus, in a typical example, a chemical modifier such as a selected lignosulfonate is utilized in an amount from about 1 to 5% by weight based on the total weight of the quicklime present and is added to the quick-stiffening mixture to act as a chemical modifier and decrease the reactivity of the quicklime. Example preferred lignosulfonates include, for example, sodium lignosulfonate and calcium lignosulfonate. The quicklime reacts at a selected rate with the water, as determined by the type and amount of chemical additive present, to form heat and calcium hydroxide. The calcium hydroxide, in turn, reacts with the aluminum powder to form hydrogen gas which expands the concrete mixture into a porous mass.

In another embodiment of the invention, the chemical modifier is premixed with the quicklime prior to introduction into the mixture of fine ground sand (or similar materials such as fly ash or mine tailings), cement, aluminum powder or water. For example, a preferred chemical additive or modifier is a polyacrylate dispersant used in an amount ranging from about 1 to 5% by weight based on the total weight of quicklime present.

In order to evaluate the reactivity of the chemically modified quicklime, industry standard tests such as those published by the American Society of Testing Materials or modifications thereof can be utilized. According to a modified ASTM C-110 test procedure, the rise in heat of a given quantity of quicklime in a given quantity of water with respect to time under standard conditions is measured. In the tests which follow, 150 grams of quicklime were mixed with 600 grams of water under controlled conditions and a 40° C. temperature rise in 4 to 10 minutes was measured.

Figure 1:
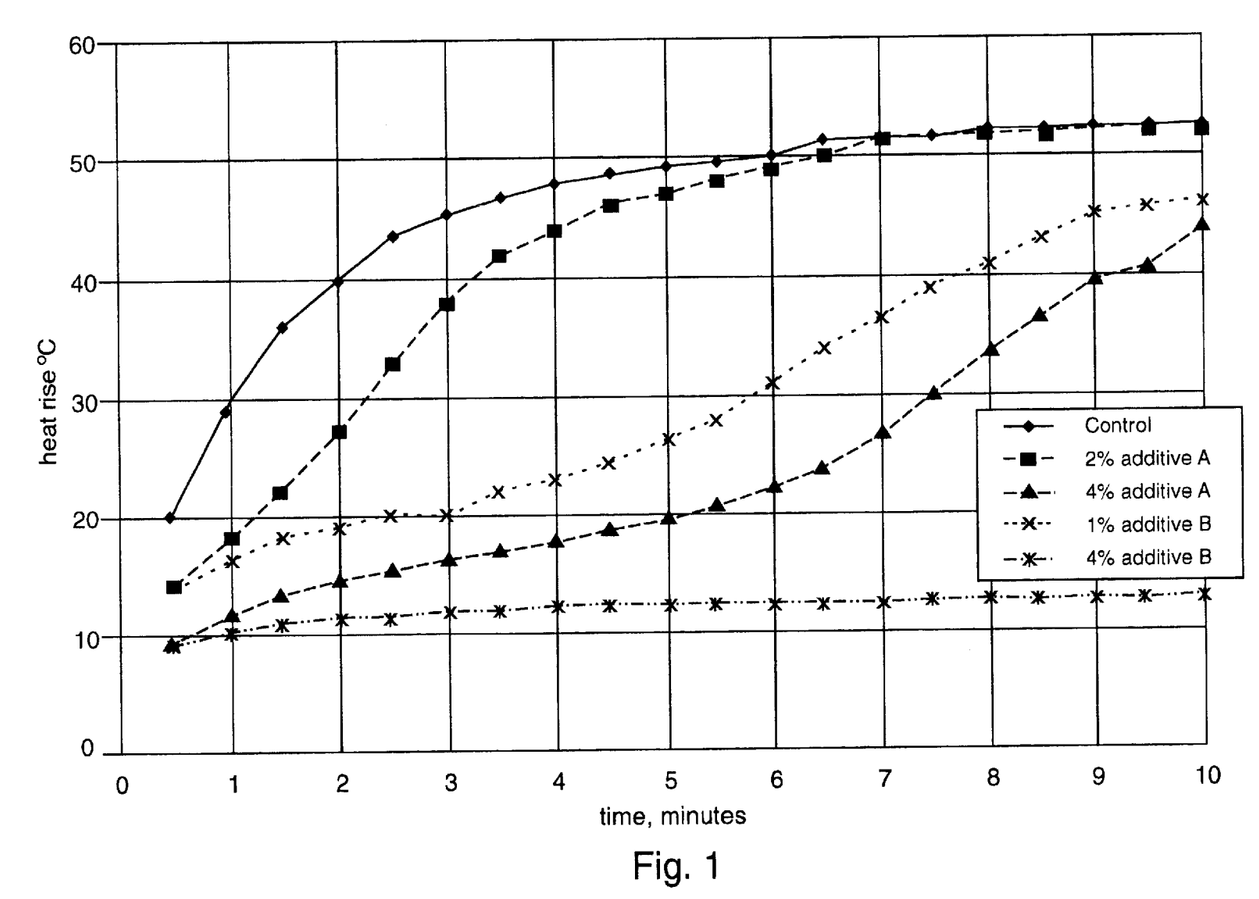
FIG. 1 is a graph of exotherm curves showing the reactivity of quicklime with various chemical additives over a time period of 0 to 10 minutes.
Figure 2:
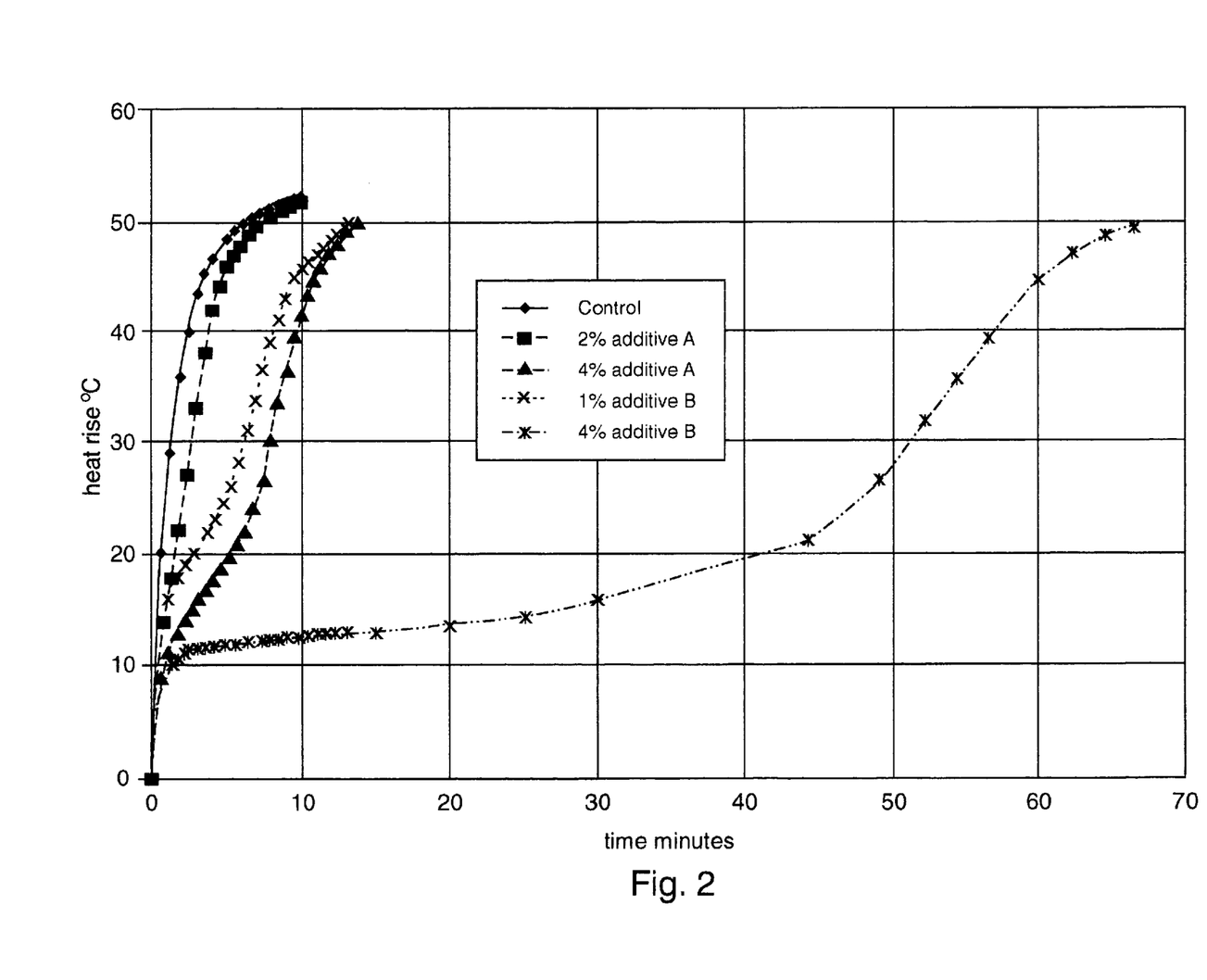
FIG. 2 is a graph of exotherm curves similar to FIG. 1 with the same chemical additives being used to modify the reactivity of the quicklime with the heat rise being shown over a time period of 0 to 70 minutes.

Referring now to FIG. 1 and FIG. 2 in the drawings, the exotherm curve designated as "Control" represents the reactivity of conventional quicklime calcined in a rotary kiln with no chemical additive. The exotherm curve designated as "2% additive A" represents the reactivity of conventional quicklime with a chemical additive of 2% sodium polyacrylate. The exotherm curve designated as "4% additive A" represents the reactivity of conventional quicklime with a chemical additive of 4% sodium polyacrylate. The exotherm curve designated as "1% additive B" represents the reactivity of conventional quicklime with a chemical additive of 1% sodium lignosulfonate. The exotherm curve designated as "4% additive B" represents the reactivity of conventional quicklime with a chemical additive of 4% sodium lignosulfonate. In FIG. 1, each of the exotherm curves representing the reactivity of conventional quicklime with a chemical additive reflects a decreased reactivity from the conventional quicklime with no additive. The greatest effect is represented by the exotherm curve for "4% additive B". FIG. 2 in the drawings illustrates the same exotherm curves of FIG. 1 over an extended period of time such that each of the four exotherm curves representing quicklime with chemical additives has leveled off.

Figure 3:
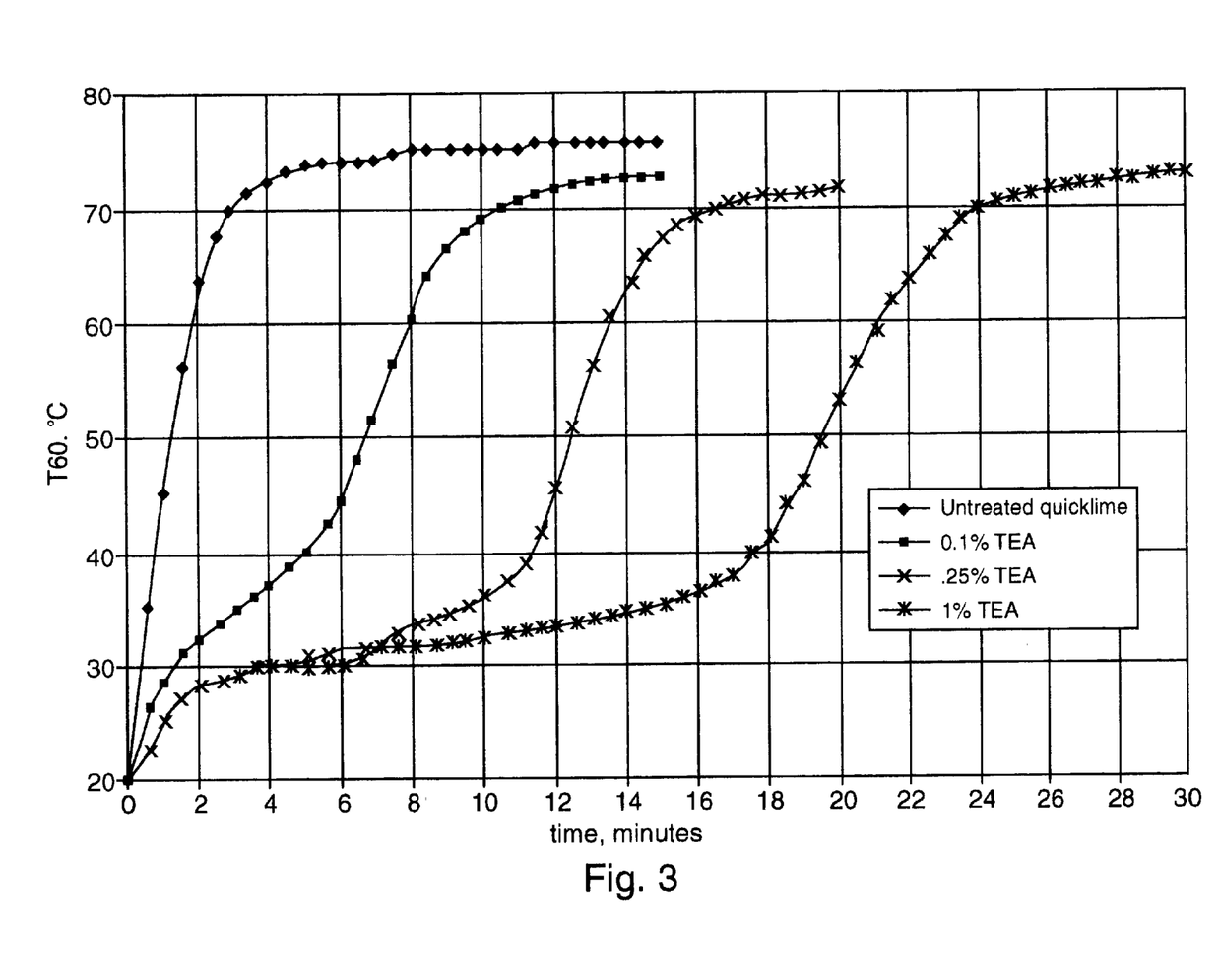
FIG. 3 is another graph of exotherm curves showing heat rise versus time where the reactivity of the quicklime has been modified by the addition of a controlled amount of water and the addition of a controlled amount of sulfuric acid.
Figure 4:
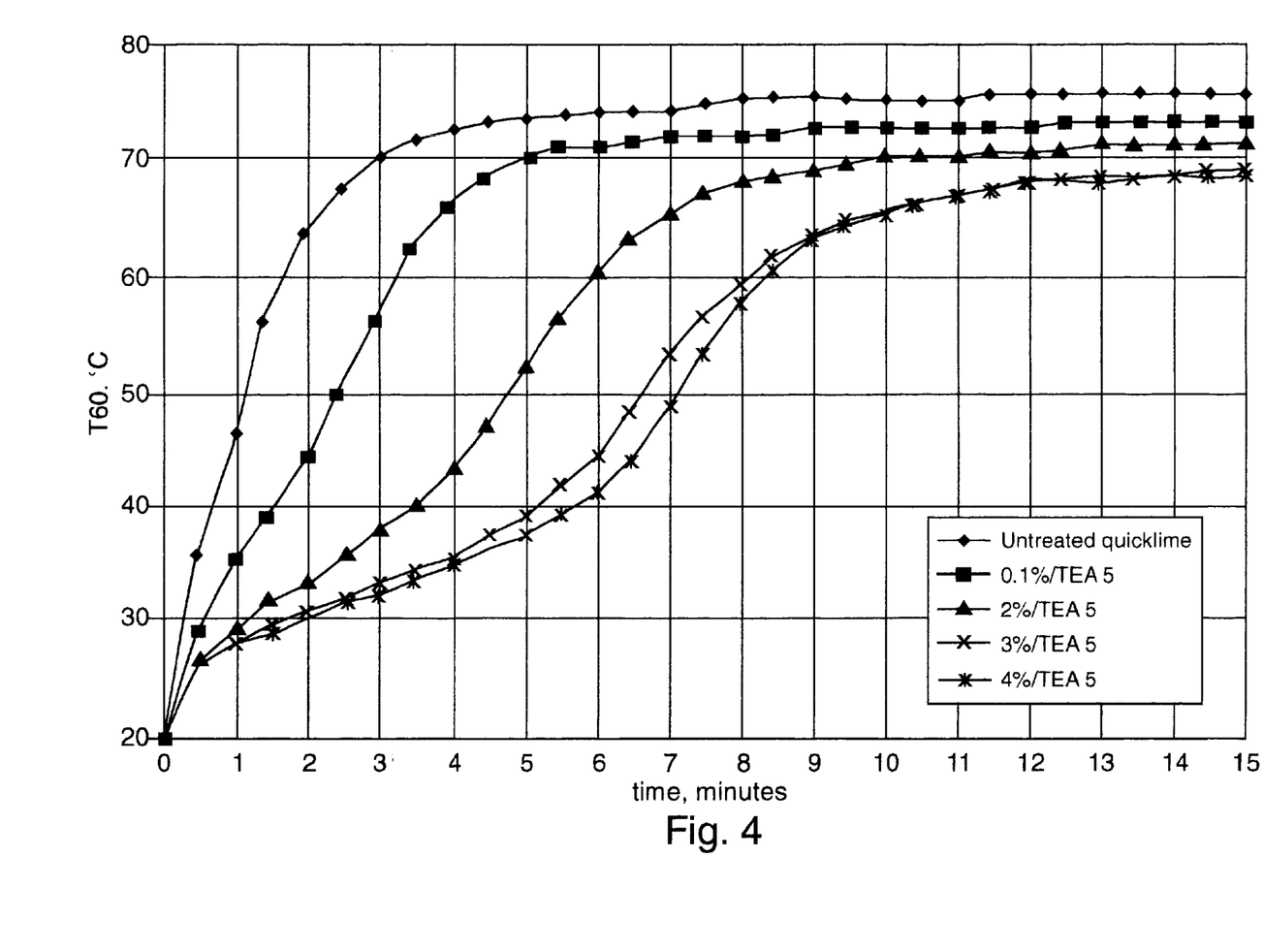
FIG. 4 is a graph of exotherm curves similar to FIG. 3 but with a different time scale.
Figure 5:
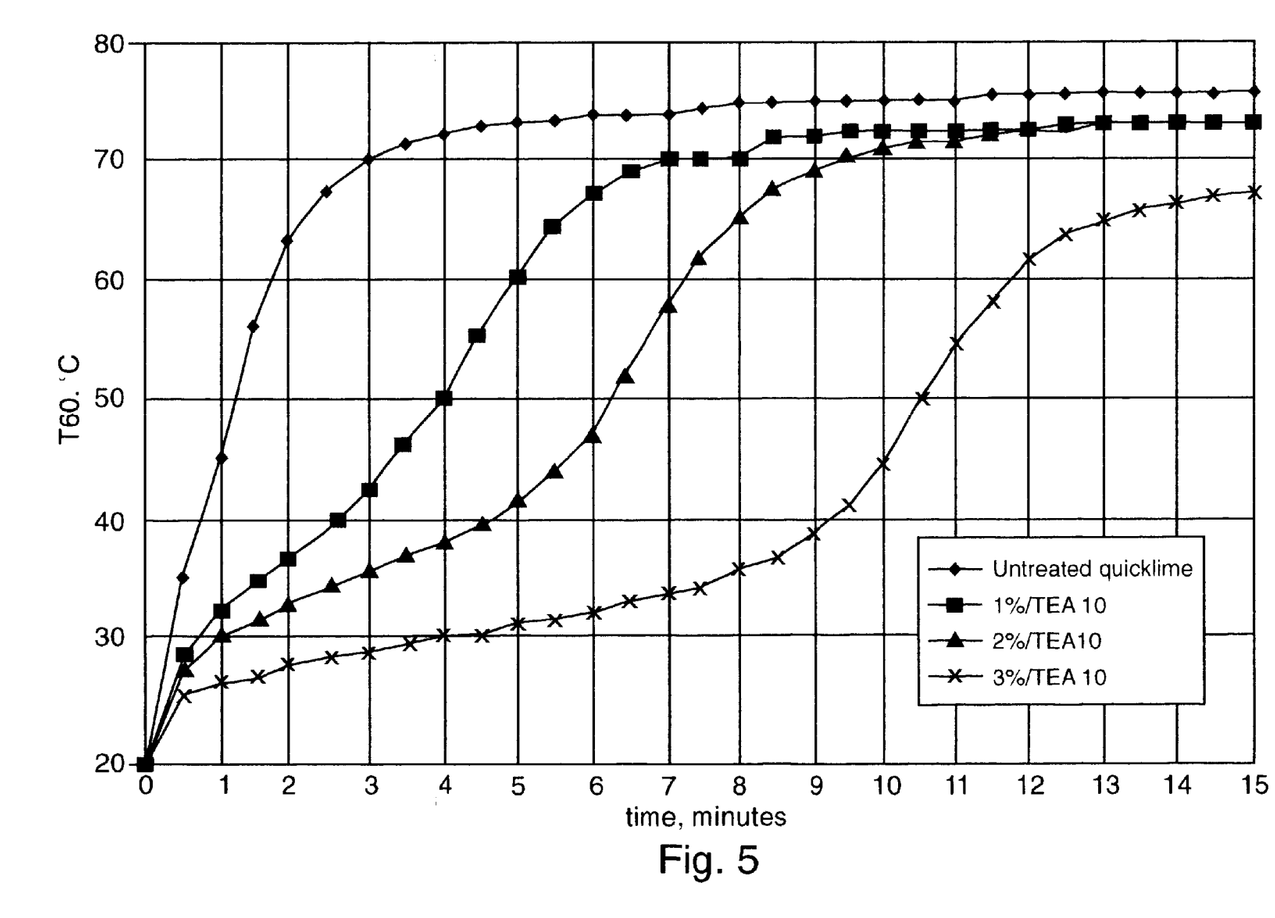
FIG. 5 is a graph of exotherm curves showing the reactivity of quicklime in the presence of gypsum with various chemical additives being used to alter the reactivity of the quicklime.

FIGS. 3–5 are generally similar to FIG. 1 previously discussed except that the graphs represent the exotherm curves of quicklime which has been chemically modified with triethanolamine in various concentrations.

Figure 6:
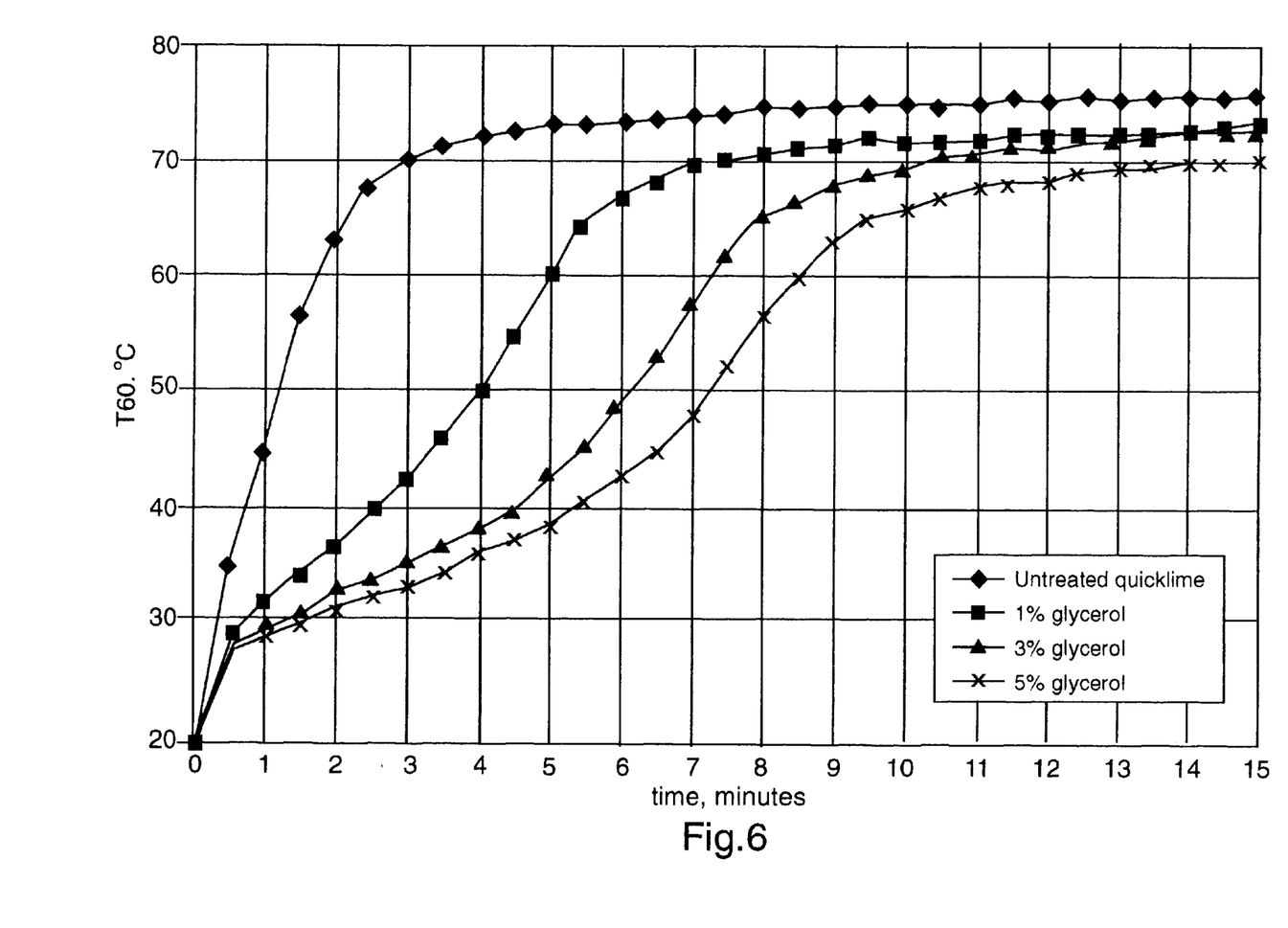
FIG. 6 is a graph of exotherm curves similar to FIG. 5 but on a different time scale.

FIG. 6 is another exotherm curve, generally similar to the curves previously discussed, in which heat rise versus time is graphed for a chemically modified quicklime in which the modifying additive is glycerol.

The data presented in FIGS. 3–6 shows that triethanolamine is a very good candidate for controlling reactivity of the quicklime. At low levels, it produces a controlled reaction which can be predicted dependably. At these levels, it also acts as a grinding aid, eliminating or limiting the need to add water or other organics which lubricate and reduce static during grinding operations. The glycerol, while effective in controlling reactivity as indicated in FIG. 6, is not as cost effective at the indicated levels but does provide an acceptable degree of control over the reactivity of the quicklime.

In addition to having a quicklime which is more slowly reactive as measured by ASTM type standards, it is also desirable that the quicklime not form larger sized agglomerated particles during the mixing reaction. This is important because the aerated concrete mixture will typically contain significant amounts of gypsum (calcium sulfate). The presence of gypsum during the slaking of quicklime is known to produce large agglomerated particles of calcium hydroxide. These large agglomerated particles are detrimental to the formation of high quality aerated autoclaved concrete.

Another aspect of the present invention is the discovery that the addition of a very small amount of water to the quicklime in a controlled manner to create a surface reaction will not only slow down the subsequent slaking reaction but will also significantly reduce the quicklime's agglomeration tendency.

Figure 7:
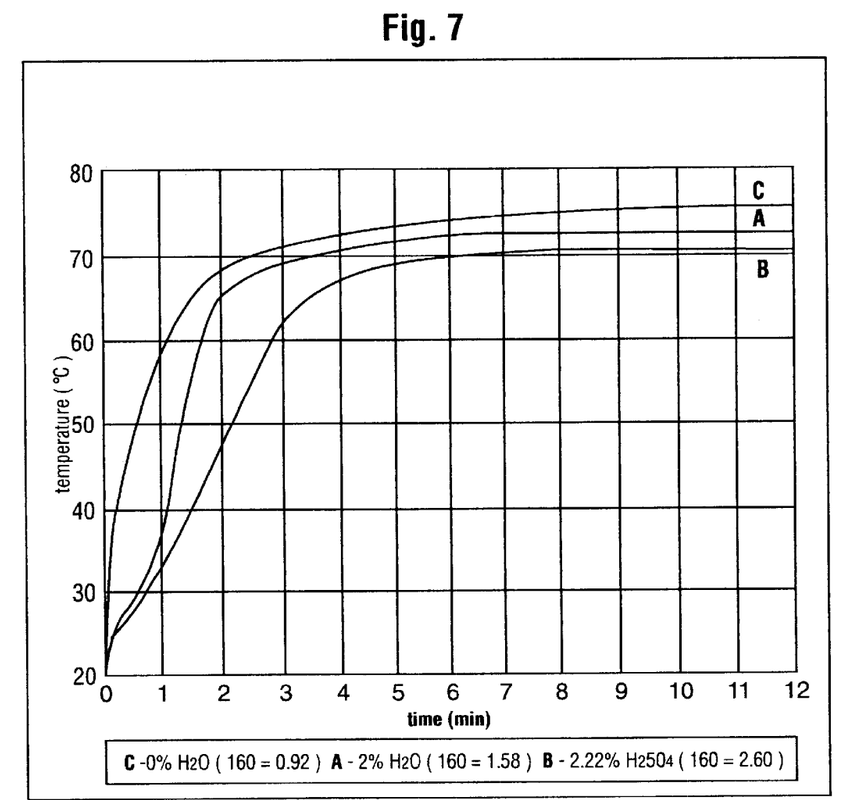
FIGS. 7–10 are exotherm curves of heat rise versus time showing the affect of various amine chemical modifiers on the reactivity of the quicklime.
Figure 9:
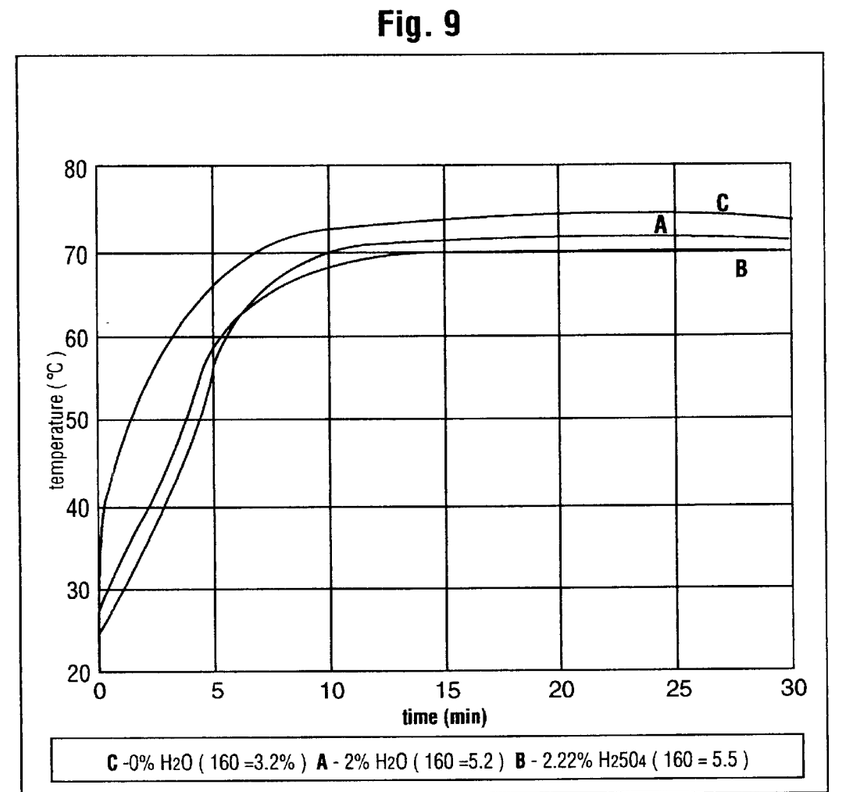

Turning to FIG. 7, the normal quicklime control had a 40° C. temperature rise (called T60) in less than 1 minute, but more importantly it had a very rapid temperature rise in the first few seconds. As shown from FIG. 3, the quicklime has a 15 to 20° C. temperature rise in 10 seconds. The agglomeration of this material during slaking is measured by the percent of material greater than 90 microns is only 3.2%. When this control quicklime is slaked in the presence of a large amount of gypsum, as would be present in an aerated autoclaved concrete mixture, the time to achieve a 40° C. temperature rise (T60) increases to 3 minutes (FIG. 9). However, the initial 10 seconds of the reaction remains about the same with a 15 to 20° C. temperature increase (FIG. 10). the agglomeration of this quicklime in the presence of gypsum increases to 80%.

Figure 8:
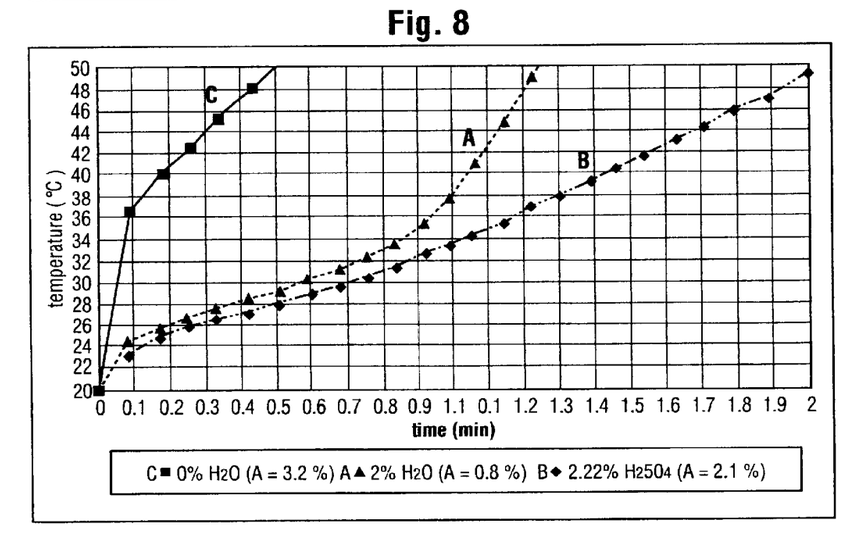
Figure 10:
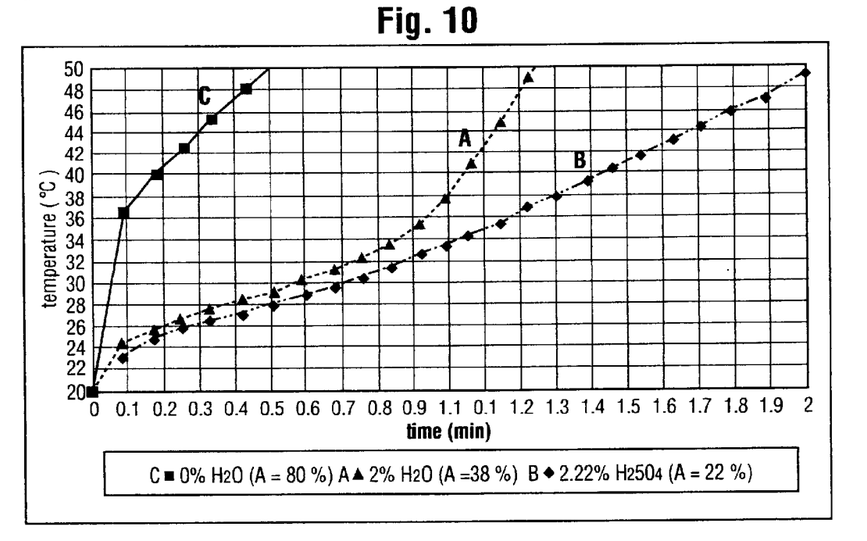

By pre-treating the quicklime with the addition of 2% water in a controlled manner, the T60 increases to approximately 1.5 minutes (FIG. 7). By "in a controlled manner" is meant that the water is sprayed or dribbled on a conveyor belt as the quicklime is passing to, for example, a ball mill or a roller mill at about, for example 15–20 tons per hour. A spray bar or other means can be used to provide an even distribution as the quicklime moves along the conveyor belt. Although the T60 increased to approximately 1.5 minutes in FIG. 7, the initial 10 seconds only have a 5° C. temperature increase (FIG. 8) and the agglomeration decreases slightly to approximately 1%. When the 2% water treated quicklime is tested with gypsum the T60 increases to 5 minutes (FIG. 9). As shown in FIG. 10, the first 10 seconds of the reaction do not change with the temperature increasing by 5° C. However, the agglomeration tendency decreases significantly to 38%.

If, instead of using a 2% water spray, a 10% solution of sulfuric acid is used (i.e., adding 2.22% of a 10% sulfuric acid to the quicklime as a pretreatment), a material is produced which not only has the slow reaction in the normal slaking test (T60 of 2.6 minutes) but which also has a low agglomeration tendency of 22% (see FIGS. 7–10).

This information is summarized in Table 1 below:

TABLE 1

| | Control QL | 2% water added | 2.22% (10% H$_2$SO$_4$ added) |
|---|---|---|---|
| Normal Slaking (1) | | | |
| T 60 (minutes) | 0.9 | 1.6 | 2.6 |
| 10 second heat rise ° C. | 20° C. | 5° C. | 5° C. |
| Agglomeration | 3% | 1% | 2% |
| Gypsum Slaking (2) | | | |
| T 60 (minutes) | 3.2 | 5 | 5.5 |
| 10 second heat rise ° C. | 18° C. | 5° C. | 4° C. |
| Agglomeration | 80% | 38% | 22% |

(1) Normal slaking 150 grams of pulverized quicklime + 600 grams of water.
(2) 150 grams pulverized quicklime + 19 grams gypsum + 600 grams water.

From Table 1, it can be seen that the use of chemical additives such as water or any other material that slows the initial 10–30 seconds of reactivity of quicklime will result in a quicklime that when tested with gypsum present and used in aerated autoclaved concrete mixes will produce a quicklime that has significantly lower agglomeration tendencies than normal soft burned high reactive quicklime.

The addition a dilute solution of sulfuric acid, or other chemicals that decrease the reactivity of quicklime, will also significantly decrease the agglomeration tendency of that quicklime if the additive is added in such a manner as to significantly lower the temperature rise of the initial 10–30 seconds of the slaking heat rise.

Figure 11:
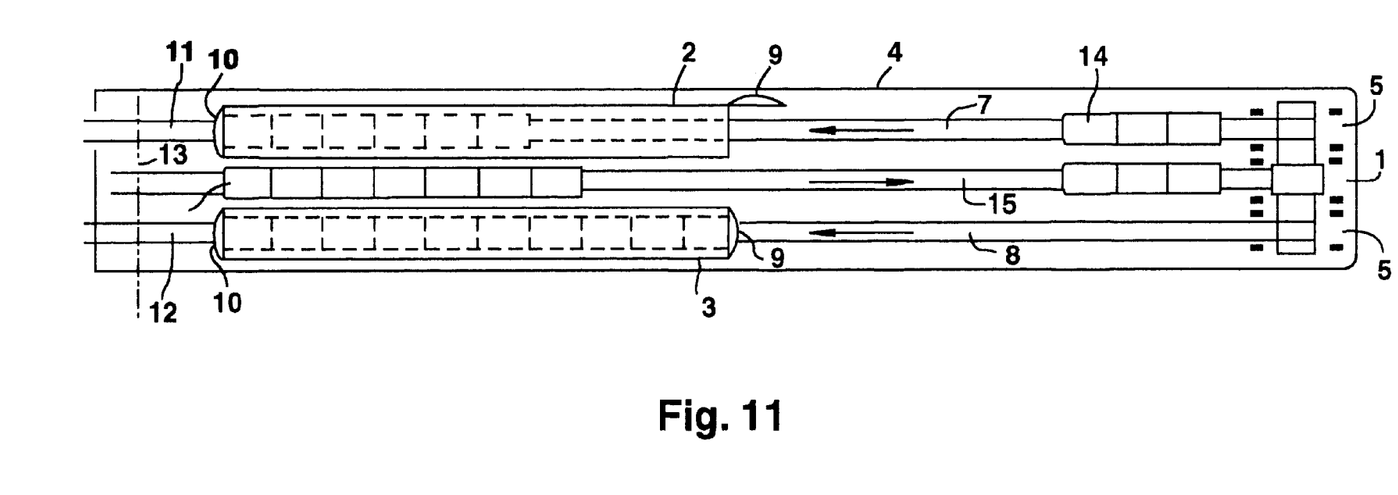
FIG. 11 is a simplified view of a prior art plant layout for the production of aerated autoclaved concrete materials.

FIG. 11 illustrates, in simplified fashion, the operation of an aerated autoclaved concrete plant. A typical plant of this type includes a casting station 1 and a steam curing station which, in this case, is comprised of two parallel autoclaves 2, 3. The plant is contained within a suitable housing 4. The casting station 1 is centrally located between two waiting positions 5 and 6, respectively. These waiting positions are connected with the autoclaves 2, 3 by means of transport tracks 7, 8 whereby green bodies of stiffened porous material can be introduced into the autoclaves in the direction indicated by the arrows.

Each autoclave has two doors 9 and 10 at the entrance and exits thereof, respectively. At each exit there are further transport tracks 11, 12, respectively, which are connected by a transverse conveyor 13 which is indicated in the drawing in simplified fashion by dotted lines.

A number of trucks 14 are used in the plant and include suitable bottoms and sides to constitute the necessary mold elements. In the plant design shown in FIG. 1, a return track 15 for the trucks 14 runs from the transverse transporter 13 to the casting station 1. The plant design illustrated is a typical design of the type described, for example, in U.S. Pat. No. 4,613,472 to Svanholm, issued Sep. 23, 1986, and is merely intended to be representative of the prior art in illustrating aerating autoclaved concrete plant layouts of the type suitable for use in practicing the present invention.

The method of the present invention, and in particular, the introduction of chemical additives to the conventional aerated autoclaved concrete mix, allows for the production of aerated autoclaved concrete of various desired properties, without modification to conventional quicklime calcination processes and independent of the variability in quality of the quicklime. Significant cost savings are achieved by using chemical additives to alter the reactivity of the quicklime instead of modifying the calcination process.

It should be apparent from the foregoing that an invention having significant advantages has been provided. While the invention is shown in only one of its forms, it is not just limited but is susceptible to various changes and modifications without departing from the spirit thereof.

What is claimed is:

1. A method of manufacturing an aerated autoclaved concrete material, the method comprising the steps of:
   preparing a quick-stiffening mixture by combining a silica containing material, modified quicklime, a rising agent, gypsum, cement and water;
   depositing the quick-stiffening mixture into a mold and allowing it to form a stiffened body;
   removing the stiffened body from the mold and placing the stiffened body in an autoclave station in which the stiffened body is steam cured at elevated temperature and pressure;
   wherein the modified quicklime which is used to form the quick-stiffening mixture is modified with a chemical modifier, wherein the chemical modifier is selected from the group consisting of water, glycerol, polyacrylates, phosphoric acid, carboxylates, sucrose and mixtures thereof to provide a desired degree of chemical reactivity in the quick-stiffening mixture;
   wherein the chemical modifier is used to pretreat the quicklime prior to the addition of modified quicklime to the quick-stiffening mixture; and
   wherein the relative reactivity of the quicklime is controlled by adding the chemical modifier in an amount sufficient to slow the initial 10 second heat rise of the quicklime to approximately 5 degrees C during subsequent slaking as measured according to ASTM C-110.

2. The method of claim 1, wherein the quick-stiffening mixture is prepared by mixing together about 60–70% by weight sand, 18–25% by weight chemically modified quicklime, 2–6% by weight Portland cement, about 0.1% by weight aluminum powder and enough water to provide a water/solids ratio of about 0.6/1.

3. The method of claim 1, wherein the quick-stiffening mixture is prepared by mixing together a silica containing material, modified quicklime, aluminum powder, gypsum, cement and water and wherein the modified quicklime has been chemically modified by addition of the chemical modifier present in an amount sufficient to provide a balance of heat rise and product agglomeration.

4. The method of claim 1, wherein the silica containing material is selected from the group consisting of sand, fly ash, mine tailings and combinations thereof.

5. The method of claim 4, wherein the cement is selected from the group consisting of ordinary Portland cement, high alumina cement, gypsum cement and blends of two or more thereof.

6. The method of claim 5, wherein the rising agent is aluminum powder.

7. A method of manufacturing an aerated autoclaved concrete material, the method comprising the steps of:

preparing a quick-stiffening mixture by combining a silica containing material, modified quicklime, a rising agent, gypsum, cement and water in a slaking operation;

depositing the quick-stiffening mixture into a mold and allowing it to form a stiffened body;

removing the stiffened body from the mold and placing the stiffened body in an autoclave station in which the stiffened body is steam cured at elevated temperature and pressure;

wherein the modified quicklime which is used to form the quick-stiffening mixture is modified with a chemical modifier, wherein the chemical modifier is selected from the group consisting of glycerol, polyacrylates, phosphoric acid, carboxylates, sucrose and mixtures thereof to provide a desired degree of chemical reactivity in the quick-stiffening mixture;

wherein the quicklime is further modified by the addition of water which is added to the quicklime in a controlled manner prior to addition of the quicklime to the quick-stiffening mixture in the slaking operation, the addition of water serving to create a surface reaction which slows down the subsequent slaking reaction and also reduces any tendency of the quicklime to agglomerate; and wherein the relative reactivity of the quicklime is controlled by adding the chemical modifier in an amount sufficient to slow the initial 10 second heat rise of the quicklime to approximately 5 degrees C during subsequent slaking as measured according to ASTM C-110.

* * * * *